United States Patent
Vogel

[11] Patent Number: 5,193,487
[45] Date of Patent: Mar. 16, 1993

[54] PET BATHING APPARATUS

[76] Inventor: Russell L. Vogel, 1018 N. Westfield Rd., Madison, Wis. 53717

[21] Appl. No.: 773,196

[22] Filed: Oct. 8, 1991

[51] Int. Cl.$^5$ .................... A01K 29/00; A47K 3/02
[52] U.S. Cl. ........................... 119/158; 4/555
[58] Field of Search .......... 119/158, 85; 4/555, 4/558, 559, 567, 570, 580

[56] References Cited

U.S. PATENT DOCUMENTS

| | | |
|---|---|---|
| 1,288,347 | 12/1918 | Wilson . |
| 1,366,734 | 1/1921 | Koehler ................ 4/567 |
| 1,377,803 | 5/1921 | Bush . |
| 1,507,860 | 9/1924 | Schober ............... 4/570 X |
| 3,119,122 | 1/1964 | Weisbeck ............. 4/580 |
| 3,151,336 | 10/1964 | Rocker ................. 4/4 |
| 3,444,564 | 5/1969 | Lavacchia ............ 4/559 |
| 3,559,216 | 2/1971 | Kyte .................... 4/555 X |
| 3,799,228 | 3/1974 | Crawford ............. 150/49 |
| 3,969,776 | 7/1976 | Gildea ................. 4/172 |
| 4,020,796 | 5/1977 | Grifa ................... 119/158 |
| 4,056,078 | 11/1977 | Blafford et al. ...... 119/158 |
| 4,083,328 | 4/1978 | Baker .................. 119/158 |
| 4,150,445 | 4/1979 | Bailey ................. 4/567 X |
| 4,312,084 | 1/1982 | Browning ............ 4/538 |
| 4,505,229 | 3/1985 | Attissimo ............ 119/158 |
| 4,525,882 | 7/1985 | Stenberg ............. 4/559 |
| 4,606,083 | 8/1986 | Kingston ............. 4/580 |
| 4,836,144 | 6/1989 | Cole .................... 119/158 |
| 4,937,897 | 7/1990 | Barnabie ............. 4/559 X |
| 5,022,101 | 6/1991 | Gosselia et al. ..... 4/580 X |

FOREIGN PATENT DOCUMENTS

| | | | |
|---|---|---|---|
| 2625070 | 6/1989 | France ................ 119/158 |
| 376947 | 7/1932 | United Kingdom ... 4/570 |
| 2172501 | 9/1986 | United Kingdom ... 4/558 |

Primary Examiner—Gene Mancene
Assistant Examiner—Nicholas D. Lucchesi
Attorney, Agent, or Firm—Lathrop & Clark

[57] ABSTRACT

A Pet Bathing Apparatus has a tub, a pet drying towel, an accessories caddy and a water spray attachment. The tube has a pet entrance, for easy access to the tub interior, and a pet restraining loop adapted for attachment to a pet collar. The tub also has a rim having fasteners to which the pet drying towel which has grommets may be attached. The tub has a drain portion which can be sealed with a plug. A drain screen is located in the drain to prevent shed pet fur from exiting with the waste bathwater. The accessories caddy for holding supplies and the water spray attachment are attachable to the tub rim. The spray attachment has a spray head, hose and rim mounting bracket, and an arm which is attachable to the tub rim and has connections for an external water supply.

4 Claims, 2 Drawing Sheets

PET BATHING APPARATUS

FIELD OF THE INVENTION

This invention relates to bath equipment, in general, and to pet bathing apparatus in particular.

BACKGROUND OF THE INVENTION

Outside of special commercial grooming facilities, pets are usually washed in the family bathtub or shower, or even occasionally in sanitary laundry tubs or in wash tubs designed for other purposes.

Bathing the pet can be a very messy job. Frequently the pet becomes anxious and reluctant to be bathed because of past unpleasant experiences. Often the pet may need to be lifted over the very tall sides of the bathtub, sanitary tub or wash tub. For larger animals, such as collies, this may be very difficult for the owner as these animals may weigh in excess of 70 lbs. Once in the tub or shower, the animal may become frightened and may try to run away and possibly injure itself in climbing over the tub's slippery sides, or the animal may injure itself on glass shower doors.

Once the animal is in the tub, it may be wetted with water, shampooed, and then rinsed with water. However, the pet may become frightened during the procedure because of soap getting in the pet's eyes or the actual physical bathing procedure and the pet may want to escape and will frequently try to shake the water and shampoo from its coat onto the person who bathes the pet. Frequently the water is also shaken onto the surrounding floor area creating a potentially slippery area and onto the wallpaper and wall covering and floor coverings of the areas in which the pet is bathed. The shake-off water sometimes leaves an unpleasant pet odor which lingers on surfaces which absorb it, such as wallpaper, bath rugs or carpeting, shower curtains or adjacent hallway carpeting. This extra mess is a bother for the pet owner to cleanup. In addition, the animal may shed excess fur during the bathing procedure. This excess fur can potentially clog the drains of the bathtub, tub or shower. After bathing the pet, the area must be sanitized and deodorized for human use.

Although bathing a pet indoors in a tub or shower intended for humans usually requires extensive cleanup, outdoor bathing of a pet in a conventional washtub or bucket is inconvenient at best, as water for bathing must be carried in a bucket to the bathing site, or more commonly will be applied from a conventional garden hose. Such a hose is difficult to control and is not generally storeable in a convenient spot while other pet cleaning steps are pursued.

Furthermore, in many cases dirty or wet pets must be lifted into the wash basin or tub, with resultant soiling of the pet bather's clothing.

What is needed is a portable pet bathing apparatus into which a pet can easily enter which restrains the pet and also minimizes bathwater dispersal on to surrounding areas.

SUMMARY OF THE INVENTION

The pet bathing apparatus of this invention has a tub, a pet drying towel, an accessories caddy and a water spray attachment. The tub has an interior, bottom and a raised peripheral wall. The raised peripheral wall has portions that are of a lesser height for a short distance. This allows easy access to the interior of the tub by a pet. The pet can easily step into and out of this tub. The peripheral wall has an upper peripheral rim with a rolled portion. This rolled portion provides a smooth edge which minimizes possible injury to the pet from a sharp edge.

Fastening means are mounted to the peripheral wall of the tub. The fastening means are adapted for securing the towel to the tub. The towel can be draped over the pet while the pet is still standing in the unit after shampooing and rinsing. This avoids some of the mess caused by the pet when the pet shakes off the water.

A tub drain opening communicates with the tub interior for removing water from the tub. A filter is disposed within the drain opening for removing pet hair from the wash water, thus preventing clogged drains. The tub opening also has a plug to prevent water from exiting during the pet bathing process. The exterior of the tub drain opening is threaded so that a hose may be attached to facilitate drainage into a sewer or other drain. Alternatively, an aspirator pump may be attached to the tub drain opening to remove water from the tub. The pet bathing apparatus further has a restraining loop mounted on the tub. The loop is adapted for attachment to a pet choke collar. The pet is restrained in the tub when wearing the choke collar which is attached to the restraining loop. This prevents the animal from suddenly trying to leap out of the tub and provides a sense of security to the animal during the bathing procedure. An accessories caddy mounts onto the upper peripheral rim of the tub and contains pet grooming supplies. A water spray attachment connects to a water supply regulated by a valve. The spray attachment includes a spray head attached to a flexible hose.

It is an object of the present invention to provide a pet bathing apparatus which is easier for a pet to step into and out of.

It is a further object of the present invention to provide secure tethering to the apparatus for the pet during the bathing procedure.

It is another object of the present invention to provide a pet bathing apparatus which collects pet hair and prevents the pet hair from entering into the house plumbing.

It is also an object of the present invention to provide a pet bathing apparatus which has a towel attachment for drying the pet while the pet is still standing in the apparatus, thus avoiding some of the mess caused by the pet shaking off the bathwater.

It is still a further object of the present invention to provide a pet bathing apparatus which is portable and can be used in various areas of the house and outdoors.

Further objects, features, and advantages of the invention will be apparent from the following detailed description when taken in conjunction with the accompanying drawings.

DESCRIPTION OF THE BEST MODE OF THE INVENTION

Figure 1:
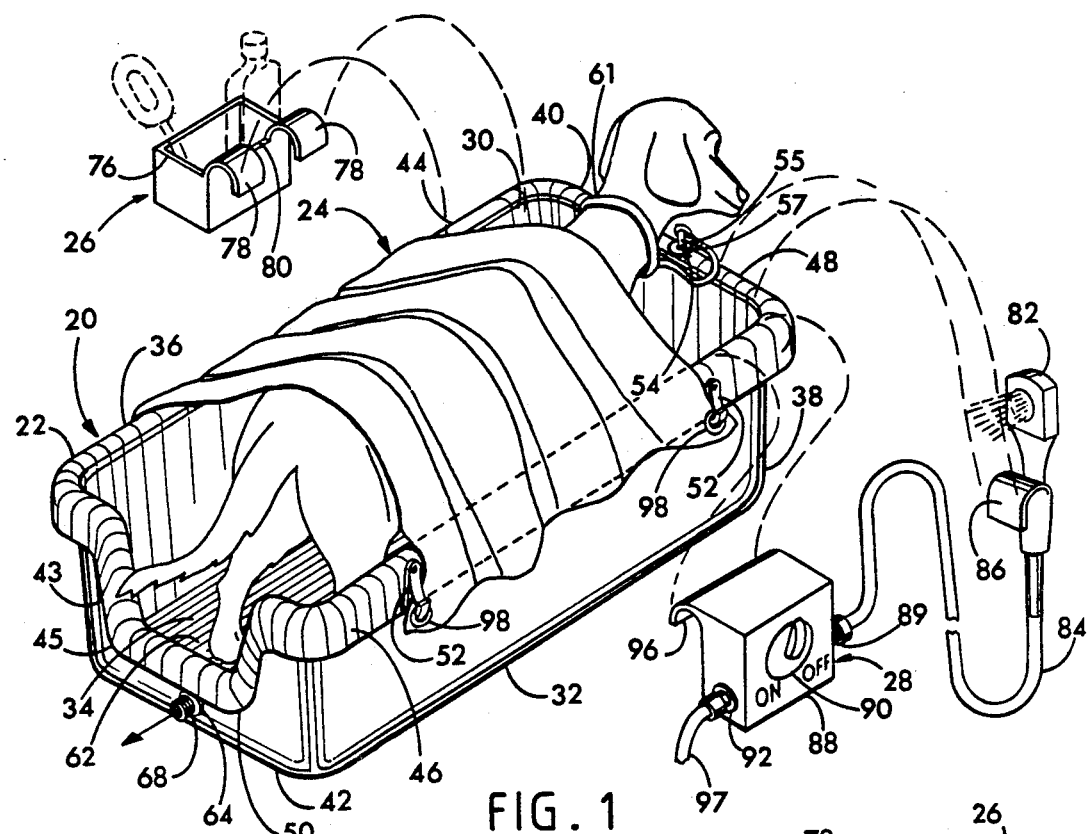
FIG. 1 is a partially exploded isometric view of the pet bathing apparatus of this invention showing a pet in the drying stage.

Referring more particularly to FIGS. 1-5, wherein like numbers refer to similar parts, a pet bathing apparatus 20 is best shown in FIG. 1. The pet bathing apparatus 20 has a tub 22, a pet drying towel 24, an accessories caddy 26 and a water spray attachment 28.

The pet bathing tub 22 is generally rectangular in shape and has a tub interior 30 and a tub exterior 32, which is formed by the tub bottom 34 and raised peripheral walls 36, 38, 40, 42 which extend upwardly from the tub bottom 34. The walls 36, 38, 40, 42 are integrally formed with the tub bottom 34 to form a container adapted to hold water. Two parallel sidewalls 36, 38 are spaced from one another. A raised front wall 40 joins the sidewalls 36, 38 and is of the same height as the sidewalls 36, 38. The rear wall 42 is spaced from the front wall 40 and parallel to it and also joins the sidewalls 36, 38. The rear wall 42 has portions which define a cutaway entrance 43 with a lip 45 which is at a lesser height than the side and rear walls 36, 38, 40. The entrance lip 45 is at a height such that a pet may easily step over the wall 42 into the interior 30 of the tub 22. Each wall 36, 38, 40, 42 has an upper edge, 44, 46, 48, 50 which extends outwardly and downwardly. The outward extension of each upper edge is sufficient to allow the tubs to be stackable. The edge has rolled portions, 44, 46, 48, 50 which provide rigidity to the tub walls 36, 38, 40, 42 and prevent injury to a pet by protecting the pet from contact with any sharp edges during the bathing procedure.

Four towel fastening means 52 are mounted on the peripheral rolled edges 44 and 46 of the tub 20. Preferably the towel fastening means 52 are flag clips, but can be velcro strips, grippers, snaps or other types of clips. The clips 52 are spaced from one another on the sides of the rolled edges 44 and 46. The clips 52 are adapted to securing a pet drying towel 24 to the tub 22.

Figure 2:
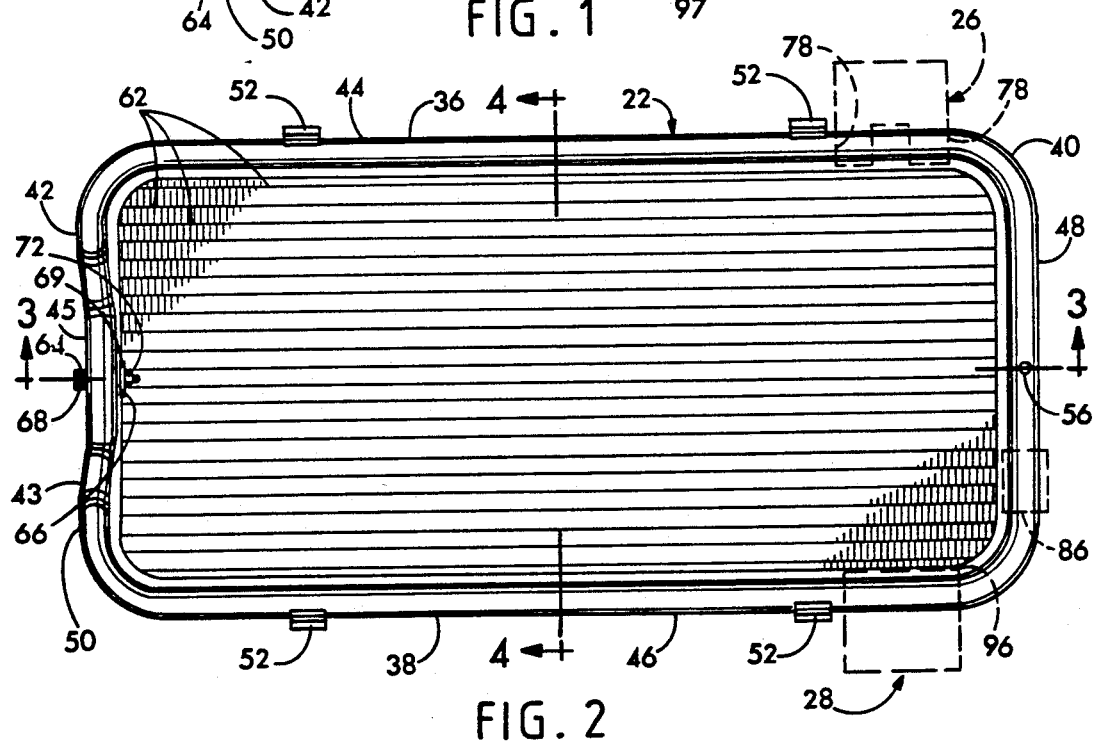
FIG. 2 is a top plan view of the pet bathing apparatus of this invention.
Figure 3:
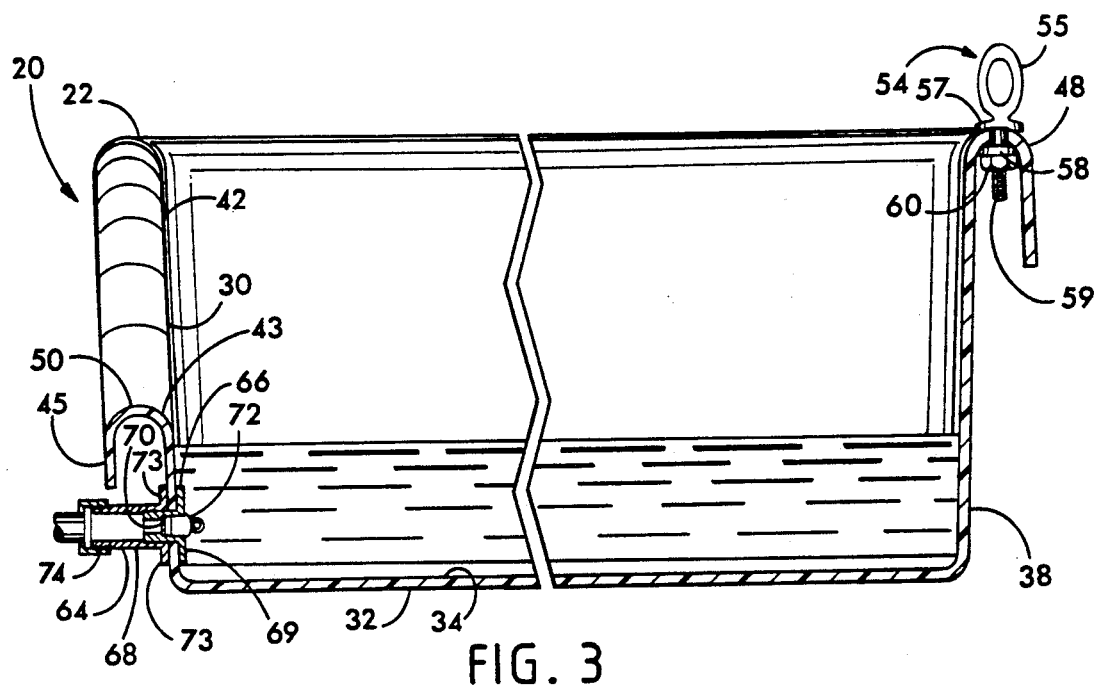
FIG. 3 is a cross-sectional view of the pet bathing apparatus of FIG. 2 taken along section line 3—3 and filled with bathwater.

As best shown in FIGS. 1-3, a restraining loop 54 is mounted on the rolled edge 48. The restraining loop 54 has a circular head portion 55, a flange 57 and a threaded shank portion 59. The restraining loop 54 can be inserted into a hole 56 in the rolled edge 48 so that the flange 57 abuts against the exterior 32 of the tub on the rolled edge 48. A washer 58 and a bolt 60 may be threaded into the restraining loop shank 59. Alternatively the loop may have a threaded shank which threads into the rolled edge 48. A pet choker collar chain 61 may be attached to the restraining loop 54. Tethering an animal thus quiets the animal and prevents the animal from wandering or bolting during the bathing procedure.

Figure 4:
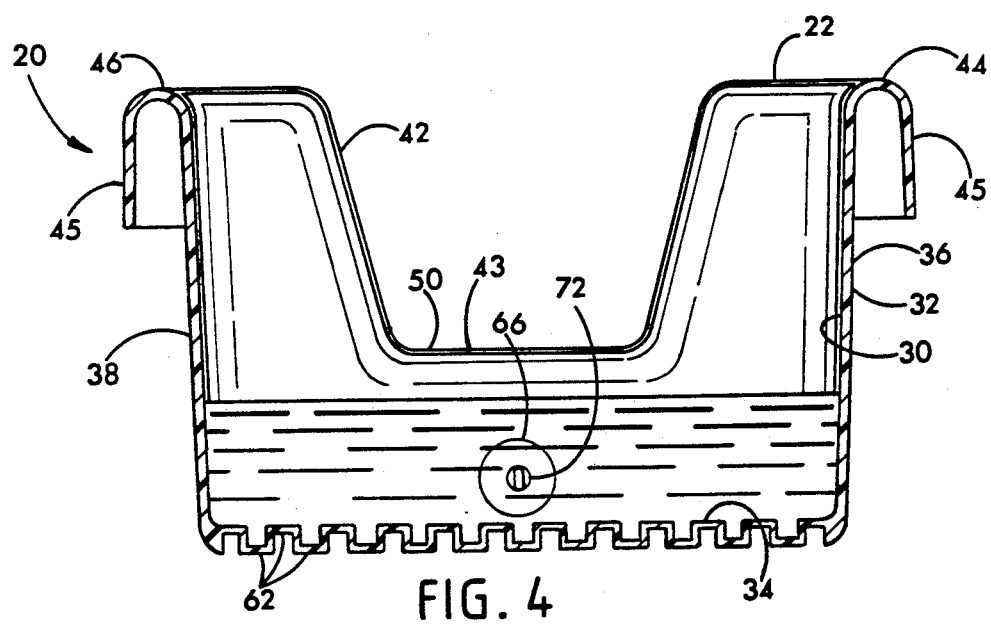
FIG. 4 is a cross-sectional view of the pet bathing apparatus of FIG. 2 taken along section line 4—4 and filled with bathwater.

As best shown in FIGS. 1, 2 and 4, rectangular interior ridges 62 extend from the tub bottom 34 and run parallel to the sidewalls 36 and 38. These ridges 62 add structural stability to the tub bottom 34 and provide a non-slip interior for the pet to step into and stand on while being bathed.

As best shown in FIGS. 1 and 3 a drain 64 is located on the rear wall 42 beneath the entrance cutaway 43 near the tub bottom 34. The drain 64 has an interior portion 66 and an exterior portion 68. The interior portion 66 has a sealing flange 69, a drain screen 70 and a removable plug 72. The sealing flange 69 abuts the interior of the tub rear wall 42. The exterior drain portion 68 is separable from the interior drain portion 66 and is directed toward the exterior 32 of the tub 22. The exterior portion 68 has an exterior sealing flange 73 and has a portion with male threads 74 which are dimensioned to threadedly engage with a female connector on a conventional garden hose. The exterior portion 68 and the interior portion 66 are connected together by threading or snap fastening the Portions together to form a sealed continuous drain pipe. The drain screen 70 engages within the interior portion 66 of the drain 64. The removable plug 72 fits within the interior portion 66 of the drain 64.

As best shown in FIG. 1, the pet bathing apparatus 20 includes an accessories caddy 26 which has a generally rectangular open container 76 with at least one hook arm 78 integrally formed with one of the rectangular sides 80 of the container 76. The hook arm 78 is curved so as to follow the curvature of the tub peripheral wall upper edge 44, 46, 48, 50. Bathing supplies, such as shampoo, flea soap, brushes, and wash cloths, may be placed in the caddy for convenient use on the pet when bathing it.

The tub 22 and caddy 26 may preferably be formed by thermoforming although blow molding and conventional injection molding would be alternative methods of forming the tub 22 and caddy 26.

The tub 22 is preferably used with the water spray attachment 28. As best shown in FIGS. 1 and 2, the water spray attachment 28 includes a spray head 82 connected to a spray head hose 84. When the spray head 82 is not in use, the hose 84 is mounted to the tub 22 by a spray head bracket 86. The spray head bracket 86 engages the curved peripheral wall upper edge of the tub and is of a curvature adapted to follow the curvature of the peripheral wall upper edge 44, 46, 48, 50. The end of the spray hose opposite the spray head 82 threads into a male connector 89 in a valve housing 88.

The valve housing 88 has a flow valve 90 and a threaded water supply inlet 92. For convenience in positioning the value housing 88 and hence the control over the water flow to the spray head 82, the housing is provided with a curved plastic attachment arm 96 which extends outwardly from the housing 88. The arm 96 has a curvature adapted to follow the curvature of the peripheral wall upper edge 44, 46, 48 and 50. The valve housing 88 and connected spray head hose 84 may thus be conveniently and detachably mounted at any desired location along the periphery of the tub 22. The water supply inlet 92 has female threading within the interior to which a hose, such as a conventional garden hose 97, having a male terminus may be connected.

In use with the pet bathing apparatus 20 the hose 97 is connected to a water source (not shown). The male terminus is connected to the female threading in the water supply inlet 92, the valve 90 is turned to the off position, and the water source is turned on. The water spray attachment arm 96 is hooked over the side of a peripheral wall edge 44, 46, 48, 50. The spray head hose 84 is threaded onto the male connector 89 of the valve chamber 88 and the spray head 82 is held in a user's hand. Alternately, the spray head hose 84 may be integrally connected to the valve housing 88. The valve 90 is opened to the "ON" position so as to allow the flow of water through the hose into the valve housing 88, out of the housing 88 into the spray head hose 84 and through the spray head 82, thereby directing a stream of water onto the pet for wetting down the pet's fur. Alternatively, the spray head may be provided with a flow valve to regulate the intensity of the spray of water through the head.

For outside use the water source will typically be an exterior utility faucet. For use within the house the house faucet should be provided with an adapter (not shown) which will allow the hose to be attached to a smaller diameter bathroom or kitchen faucet.

Figure 5:
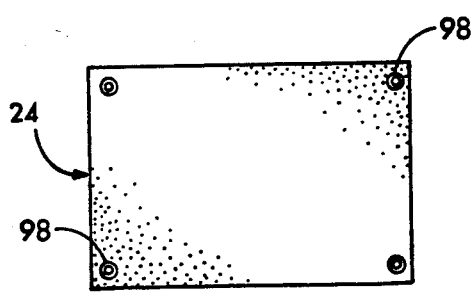
FIG. 5 is a top plan view at reduced scale of the drying towel of the apparatus of FIG. 1.

The pet drying towel 24, shown in FIGS. 1 and 5, is generally rectangular in shape with eyelets 98 disposed in each of the corners of the towel. The towel fastening means 52 mounted on the peripheral wall upper edge 44, 46, 48, 50, engage with the eyelets 98 and serve to fasten the towel eyelets 98. Alternatively, metallic grommets or other openings may be used in lieu of towel eyelets 98. The towel may also be supplied with one portion of a hook and loop fastener such as VELCRO ® material, or the towel may simply be clamped by an opposed jaw-type fastener on the tub. The towel 24 is of sufficient width and length so as to be draped over a standing pet to cover the pet and the tub 22 when the pet shakes off bathwater.

In using the pet bathing apparatus 20, the water spray attachment 28 is attached to a desired wall upper edge 44, 46, 48, 50, the plug 72 is inserted into the drain 64, and a hose 100 is connected to the valve housing, with the valve 90 in the "OFF" position. The water may then be turned on and the valve 90 turned to the "ON" position to partially fill the tub with water before the pet enters. Alternatively, the pet may first be allowed to step over the lesser height wall 42 into the tub. Once within the tub, the pet is tethered to the restraining loop 54. At this time, the towel 24 may be fastened to the peripheral wall 38 on the upper wall edge 46 using the towel fastening means 52 and the towel 24 eyelets 98 leaving free the other side of the towel 24 to be fastened after the pet has been bathed and before the pet shakes. The accessories caddy 26 is attached by hanging the hook arms 78 over the wall upper edge 44, 46, 48 or 50. The pet is then sprayed with water by moving the flow valve 90 to the "ON" position. After the pet has been shampooed, rinsed, or otherwise cleansed, the drying towel 24 is draped over the pet and fastened through the towel eyelets 98 to the towel fastening means 52 on the opposite peripheral wall 36 of the tub 22.

After the pet has been dried and has left the tub 22, the tub 22 may be drained by removing the plug 72, allowing water to flow out of the exterior portion 68 of the drain 64. By connecting a hose 100 to the drain 64, this stream of water may be directed to a floor drain or sewer. For outdoor bathing, the bathwater may be drained directly onto the grass or pavement. Alternatively, a pump (not shown) may be attached to the drain 64, and the bathwater pumped out of the tub 22 to a suitable location for disposal. After the pet has shaken itself, the wet towel 24 may be released from the tub fastening means 52 and the pet led out of the tub 22. The interior of the tub may then be cleaned, the pet hair removed from the drain screen 70, the tub 22 rinsed with a hose and hung to dry by the restraining loop 54, and then stored for future use.

For efficient transport and retail storage, multiple tubs 22 may be stacked one on the other, each separated by the rolled downwardly extending upper edge 44, 46, 48, 50. This provides for convenient and economical shipping of the tubs to retail centers. The towel 24, accessories caddy 26, water spray attachment 28, drain 64 and restraining loop 54 may be shrink-wrapped in a single package as a kit and nestled in the interior 30 of the tub bottom 34. Directions packaged with the apparatus 20 aid a user with only simple assembly skills in assembling the pet bath.

It is understood that the invention is not confined to the particular construction and arrangement of parts herein illustrated and described, but embraces such modified forms thereof as come within the scope of the following claims.

I claim:

1. A pet bathing apparatus comprising:
 (a) a plastic tub having a bottom and a peripheral wall which extends upwardly from the bottom to form an enclosed cavity for retaining bathwater therein, the peripheral wall having an upper rim at a selected height, wherein portions of the peripheral wall define an entry passage through the peripheral wall having a lip which is beneath the peripheral wall rim, the entry passage adapted to facilitate the entrance of a pet into the tub;
 (b) a valve housing;
 (c) a valve located within the valve housing and being operable to selectively prevent or allow the flow of water through the valve;
 (d) a flexible hose extending from the valve housing, wherein the hose and valve housing are engaged with the tub rim;
 (e) a water spray head connected to the flexible hose; and
 (f) a pet restraint loop extending from the peripheral wall opposite the entry passage and adjacent the tub cavity, the loop being secured to the tub and adapted to engage a collar worn by a pet to restrain the pet within the tub cavity.

2. A pet bathing apparatus comprising:
 (a) a plastic tub having a bottom and a peripheral wall which extends upwardly from the bottom to form an enclosed cavity for retaining bathwater therein, the peripheral wall having an upper rim at a selected height, wherein portions of the peripheral wall define an entry passage through the peripheral wall having a lip which is beneath the peripheral wall rim, the entry passage adapted to facilitate the entrance of a pet into the tub;
 (b) a valve housing;
 (c) a valve located within the valve housing and being operable to selectively prevent or allow the flow of water through the valve;
 (d) a flexible hose extending from the valve housing;
 (e) a water spray head connected to the flexible hose;
 (f) a curved plastic protrusion extending outwardly and downwardly from the valve housing, the protrusion engaging with the tub rim to support the valve housing thereon; and
 (e) a pet restraint loop extending form the peripheral wall opposite the entry passage and adjacent the tub cavity, the loop being secured to the tub and adapted to engage a collar worn by a pet to restrain the pet within the tub cavity.

3. A pet bathing apparatus comprising:
 (a) a plastic tub having a bottom and a peripheral wall which extends upwardly from the bottom to form an enclosed cavity for retaining bathwater therein, the peripheral wall having an upper rim at a selected height, wherein portions of the peripheral wall define an entry passage through the peripheral wall having a lip which is beneath the peripheral wall rim, the entry passage adapted to facilitate the entrance of a pet into the tub;

(b) a valve housing;
(c) a valve located within the valve housing and being operable to selectively prevent or allow the flow of water through the valve;
(d) a flexible hose extending from the valve housing;
(e) a water spray head connected to the flexible hose;
(f) a curved plastic protrusion extending outwardly and downwardly from the valve housing, the protrusion engaging with the tub rim to support the valve housing thereon;
(g) a plurality of releasable fasteners attached to the rim of the tub; and
(h) a towel having portions which releasably engage with the tub fasteners located at each corner, the towel being sufficiently wide to allow attachment of the towel across the tub cavity to overlie a pet contained therein.

4. A pet bathing kit comprising:
(a) a plastic tub having a bottom and a peripheral wall which extends upwardly from the bottom to form an enclosed cavity for retaining bathwater therein, the peripheral wall having an upper rim at a selected height, wherein portions of the peripheral wall define an entry passage through the peripheral wall having a lip which is beneath the peripheral wall rim, the entry passage adapted to facilitate the entrance of a pet into the tub, the tub having portions of the peripheral wall defining a drain hole extending through the peripheral wall and beneath the entry passage;
(b) a plurality of releasable fasteners adapted for attachment to the rim of the tub;
(c) a pet restraint loop adapted for attachment to the tub to extend from the peripheral wall opposite the entry passage and adjacent the tub cavity, the loop being adapted to engage a collar worn by a pet to restrain the pet within the tub cavity;
(d) a plug selectably engagable within the drain hole to alternatively prevent or allow the escape of bathwater from the tub; and
(i) a valve housing;
(ii) a valve located within the valve housing and being operable to selectively prevent or allow the flow of water through the valve;
(iii) a flexible hose extending from the valve housing;
(iv) a water spray head connected to the flexible hose;
(v) a curved plastic protrusion extending outwardly and downwardly from the valve housing, the protrusion being engagable with the tub rim to support the valve housing thereon;
(vi) a bracket affixed to the water spray head, the bracket extending outwardly and downwardly from the spray head and selectably engagable with the tub rim to permit the positionable placement of the spray head along the rim of the tub.

* * * * *